US 8,543,861 B1

(12) United States Patent
Sawhney et al.

(10) Patent No.: US 8,543,861 B1
(45) Date of Patent: Sep. 24, 2013

(54) SYSTEMS AND METHODS FOR DIAGNOSING A NETWORK CONFIGURATION OF A COMPUTING DEVICE

(75) Inventors: Sanjay Sawhney, Cupertino, CA (US); Anand Kashyap, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 468 days.

(21) Appl. No.: 12/753,542

(22) Filed: Apr. 2, 2010

(51) Int. Cl.
*G06F 11/07* (2006.01)

(52) U.S. Cl.
USPC .............. 714/4.1; 714/4.2; 714/4.3; 714/4.4; 714/26

(58) Field of Classification Search
USPC .......................................................... 714/4.1
See application file for complete search history.

(56) References Cited

U.S. PATENT DOCUMENTS

| | | | | |
|---|---|---|---|---|
| 8,166,144 B2* | 4/2012 | Siegmund | | 709/223 |
| 2004/0019676 A1* | 1/2004 | Iwatsuki et al. | | 709/224 |
| 2006/0092404 A1* | 5/2006 | Weller | | 356/73.1 |
| 2006/0168183 A1* | 7/2006 | Fuller et al. | | 709/223 |
| 2006/0212924 A1* | 9/2006 | Xie et al. | | 726/1 |
| 2007/0088981 A1* | 4/2007 | Noble et al. | | 714/26 |
| 2008/0060066 A1* | 3/2008 | Wynn et al. | | 726/6 |
| 2008/0104217 A1* | 5/2008 | Srinivasa et al. | | 709/223 |
| 2008/0155436 A1* | 6/2008 | Britt et al. | | 714/43 |
| 2008/0259806 A1* | 10/2008 | Jorgenson | | 370/242 |
| 2009/0075655 A1* | 3/2009 | Dobson et al. | | 455/436 |
| 2009/0164517 A1* | 6/2009 | Shields et al. | | 707/104.1 |
| 2009/0319249 A1* | 12/2009 | White et al. | | 703/13 |
| 2009/0323516 A1* | 12/2009 | Bhagwan et al. | | 370/216 |
| 2010/0100767 A1* | 4/2010 | Liu et al. | | 714/28 |
| 2010/0180016 A1* | 7/2010 | Bugwadia et al. | | 709/220 |
| 2010/0208706 A1* | 8/2010 | Hirano et al. | | 370/332 |
| 2011/0087920 A1* | 4/2011 | Hendricks et al. | | 714/21 |
| 2011/0125802 A1* | 5/2011 | Van Der Merwe et al. | ... | 707/792 |
| 2011/0138234 A1* | 6/2011 | Biazetti et al. | | 714/48 |

OTHER PUBLICATIONS

Website: http://www.microsoft.com/windowsxp/using/networking/expert/russel_diagnostics.mspx, *Using the Network Diagnostics Tool*, WindowsXP, Jul. 31, 2006 (5 pgs.).
Website: http://research.microsoft.com/apps/pubs/default.aspx?id=78399, *NetPrints: Diagnosing Home Network Misconfigurations Using Shared Knowledge*, Microsoft Research, Apr. 2009 (1 pg.).
Website: http://docs.info.apple.com/article.html?path=Mac/10.4/en/mh2079.html, *Using Network Diagnostics*, Mac OS X 10.4 Help, Apr. 20, 2010 (1 pg.).
Website: http://whirlpool.net.au/wiki/?tag=Linux_NW_Diag_Cmds, *Linux Network Diagnostic Commands*, Whirlpool, Apr. 20, 2010 (5 pgs.).

* cited by examiner

*Primary Examiner* — Chae Ko
(74) *Attorney, Agent, or Firm* — Holland & Hart LLP

(57) ABSTRACT

A computer-implemented method for diagnosing a network configuration of a computing device is described. A test network configuration is captured. A test network signature is generated from the test network configuration. A label is assigned to the test network signature. A determination is made as to whether the test network signature is labeled as an unsuccessful network signature. If the test network signature is labeled unsuccessful, one or more procedures to change the label are generated.

20 Claims, 14 Drawing Sheets

SYSTEMS AND METHODS FOR DIAGNOSING A NETWORK CONFIGURATION OF A COMPUTING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. For example, users demand improvements in the functionality of computing devices. Computer software and other computer products may be developed to improve various functions of computer device. Problems and errors associated with connecting to a network may hinder the functionality of a computing device. As explained above, computer networks may be used to communicate and share data between various computers connected to the networks. If a computing device is unable to establish and maintain a connection with a network, the device is unable to communicate and share data with other devices. As such, benefits may be realized by providing systems and methods for diagnosing a network configuration of a computing device.

SUMMARY

According to at least one embodiment, a computer-implemented method for diagnosing a network configuration of a computing device is described. A test network configuration is captured. A test network signature is generated from the test network configuration. A label is assigned to the test network signature. A determination is made as to whether the test network signature is labeled as an unsuccessful network signature. If the test network signature is labeled unsuccessful, one or more procedures to change the label are generated.

A repository may be downloaded from a database. The repository may include one or more network signatures associated with one or more additional computing devices. In one embodiment, one or more values associated with one or more attributes of the test network signature may be analyzed. A label may be assigned to the test network signature based on the analysis.

In one configuration, a machine learning based algorithm may be executed based on the test network signature and the one or more network signatures in the repository. The procedures may be provided as troubleshooting steps to execute in order to change the label of the test network signature from unsuccessful to successful. The labeled test network signature may be transmitted to a repository within a database. In one example, a decision tree may be generated based on at least one test network signature in the repository. The decision tree may classify the test network signature as unsuccessful or successful. The one or more procedures to execute in order to change the label may be organized into a specific order. The specific order may provide a minimum number of procedures to execute in order to change the label.

A computer system configured to diagnose a network configuration is also described. The system may include a processor and memory in electronic communication with the processor. The system may further include a diagnostic tool. The tool may be configured to capture a test network configuration, and generate a test network signature from the test network configuration. The tool may also be configured to assign a label to the test network signature, and determine whether the test network signature is labeled as an unsuccessful network signature. If the test network signature is labeled unsuccessful, the tool may be configured to generate one or more procedures to change the label.

A computer-program product for diagnosing a network configuration of a computing device is also described. The computer-program product may include a computer-readable medium having instructions thereon. The instructions may include code programmed to capture a test network configuration, and code programmed to generate a test network signature from the test network configuration. The instructions may also include code programmed to assign a label to the test network signature, and code programmed to determine whether the test network signature is labeled as an unsuccessful network signature. If the test network signature is labeled unsuccessful, the instructions may include code programmed to generate one or more procedures to change the label.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
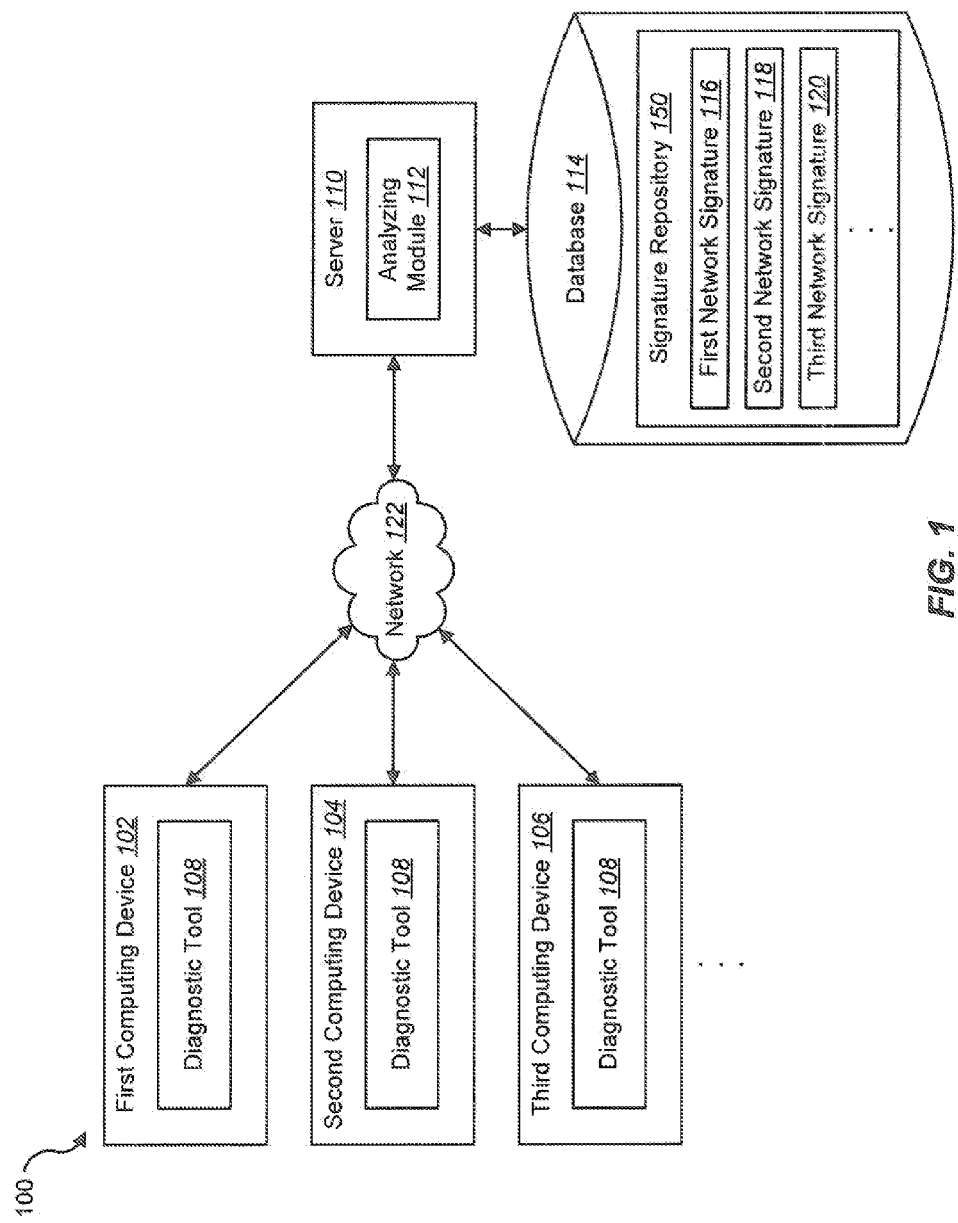
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Computing devices may be part of a network. A network may include a collection of computing devices that are connected by communications channels that allow communications among users and allows the users to share resources with other users. In some instances, the network configurations of a computing device may be unsuccessful in connecting to the network. When a connection error occurs, network diagnostics may be implemented to correct the problem. Current techniques for network diagnostics generally involve providing the user with a predefined set of troubleshooting steps to perform. Typically, current techniques may provide a flow chart that includes the predefined troubleshooting steps for the user to perform. These steps may have been previously generated by an expert, or from the most common problems relating to network configurations. The end user may use the flow chart to discover possible troubleshooting steps to take to attempt to correct the network problem. The steps may include, for example, checking to determine if a particular cable is connected, checking to determine if a network is turned on, and the like.

The current techniques for network diagnostics have several limitations. For example, a predefined set of steps may not be easily expandable. In addition, a predefined set of steps may only address a small set of problems and may not be able to diagnose relatively rare problems. Further, the troubleshooting steps currently provided are not optimized for a fast response based on the user's history, and predefined troubleshooting steps are platform dependent.

In one embodiment, the present systems and methods provide a database that includes "successful" and "unsuccessful" network configurations. In one example, "successful" network configurations may include configurations that are able establish and maintain network connectivity. "Successful" configurations may also be referred to as "good" network configurations. Similarly, "unsuccessful" configurations include configurations that are unable to establish or maintain network connectivity. The "unsuccessful" configurations may be referred to as "bad" network configurations.

In one configuration, the database that includes "good" and "bad" network configurations may be built by collecting data relating to the network configurations for various computing devices. A machine-learning based algorithm may be used on the collected data in the database. The algorithm may determine the least number of changes to a "bad" network configuration that are required in order to mutate the "bad" network configuration from a bad network state to a good network state. These changes may be provided to the user as a customized set of troubleshooting steps.

The data-driven architecture makes the generated solution to a network problem dynamic and expanding. In addition, the generation of customized troubleshooting steps based on the history of user data may optimize the response time for diagnosis of the network problem. The present systems and methods may also be platform independent and may be implemented on a personal computer (PC) platform, a Mac platform, mobile platforms, and any other type of platform.

FIG. 1 is a block diagram illustrating one embodiment of an environment 100 in which the present systems and methods may be implemented. In one configuration, one or more computing devices 102, 104, 106 may communicate with a server 110 across a network connection 122. The network connection 122 may be a wide area network (WAN), a local area network (LAN), virtual private network (VPN), an Internetwork, the Internet, an intranet, and the like. The computing devices 102, 104, 106 may be a personal computer (PC), a laptop, a personal digital assistant (PDA), a mobile device, a smartphone, or any other type of computing device. In one example, each computing device 102, 104, 106 may include a network diagnostic tool 108. The tool 108 may run on each computing device 102, 104, 106 and may be used to collect data and diagnose network configurations.

In one configuration, the data collected by the diagnostic tool 108 may be transmitted across the network connection 122 to the server 110. The data may then be stored in a database 114. In one embodiment, the data received from the diagnostic tool 108 may be a network signature 116, 118, 120. In one embodiment, a network signature of a computing device may define the network configurations of that computing device. For example, a "bad" network signature may indicate that the current network configurations of the computing device are unsuccessful in establishing and maintaining a connection with the network 122. In one example, if the network connection 122 is not available to the server 110, the diagnostic tool 108 may store the data locally. The data may then be transmitted at a later time to the server 110 when the network connection 122 becomes available.

In one embodiment, the diagnostic tool 108 running on a first computing device 102 may transmit a first network signature 116 to the server 110. The first network signature 116 may be stored in the database 114 in a signature repository 150. As explained above, the first network signature 116 may indicate whether the current network configurations of the first computing device 102 are "good" or "bad". Similarly, the tool 108 running on the second computing device 104 may transmit a second network signature 118 to the server 110, and the tool 108 running on a third computing device 106 may transmit a third network signature 120 to the server 110. Each received network signature 116, 118, 120 may be stored in the signature repository 150 of the database 114. In one configuration, the server 110 may include an analyzing module 112 that may perform analysis on the signatures 116, 118, 120 stored in the signature repository 150.

While FIG. 1 only illustrates three computing devices, it is to be understood that the present systems and methods may include more or less than three devices. In addition, the signature repository 150 may store more or less than three network signatures for various computing devices.

Figure 2:
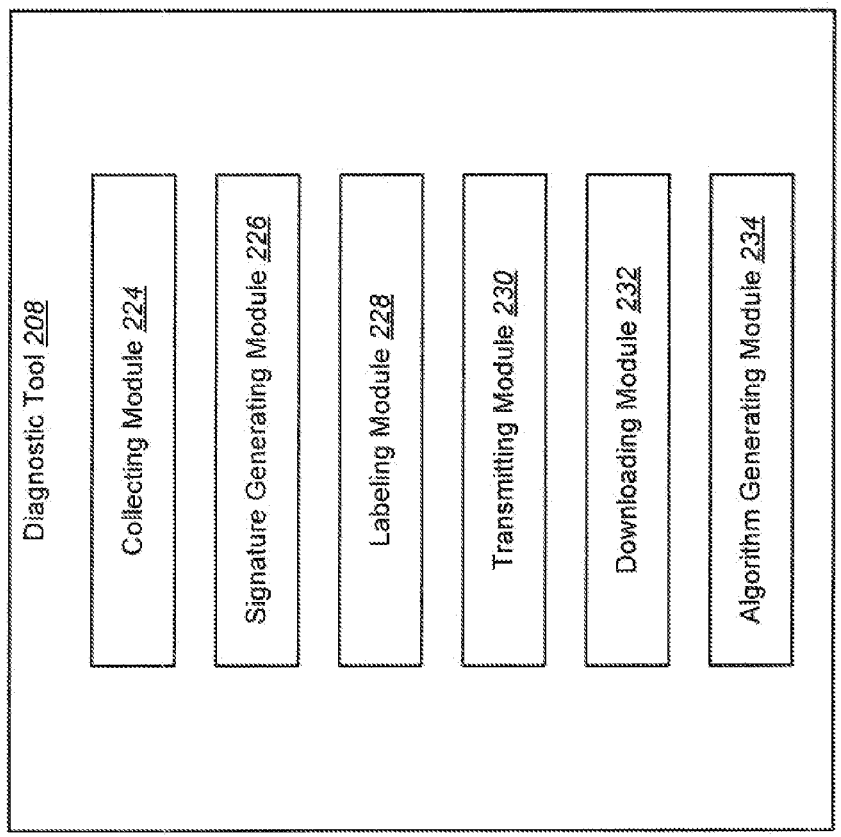
FIG. 2 is a block diagram illustrating one embodiment of a diagnostic tool.

FIG. 2 is a block diagram illustrating a further embodiment of a diagnostic tool 208. In one embodiment, the tool 208 may run as a background process on a computing device 102, 104, 106. In another embodiment, the diagnostic tool 208 may run in the foreground as an interactive process with the user of the computing device 102, 104, 106.

While running as a background process, the tool 208 may be set to operate in a training mode. In this mode, a collecting module 224 may collect data relating to the network configurations of the computing device. The collected data may be used to train a machine learning algorithm. The algorithm may be used for network diagnostics.

In one embodiment, a signature generating module 226 may take periodic snapshots of the network configuration for a computing device. The snapshots of the network configuration may be referred to as a network signature. These network signatures may be collected by the collecting module 224. A labeling module 228 may label each network signature as "good" or "bad", depending on the instantaneous network state. For example, if the current network configurations are unable to establish and maintain network connectivity, the network signature for the current network configurations may be labeled as a "bad" network signature.

In one embodiment, a transmitting module 230 may transmit the labeled network signature to an online repository, such as the signature repository 150. The signature repository 150 may collect and store network signatures for network configurations of multiple computing devices 102, 104, 106.

As previously stated, the diagnostic tool 208 may run in the foreground of a computing device as an interactive process. While running as an interactive process, the tool 208 may run in a diagnostic mode. If a user experiences a networking problem (e.g., unable to establish or maintain network connectivity), the user may change the tool 208 from running in the background to running in the foreground of the computing device. While running in the foreground, the user may interact with the tool 208 to manually generate and transmit a network signature to the signature repository 150. Because networking problems exist, the current network configurations are unsuccessful, and the network signature may be labeled as a "bad" network signature.

The tool 208 may download data previously stored in the signature repository 150 in order to fix the networking problem. In one embodiment, a downloading module 232 may download the entire signature repository 150, or a compact version of the repository 150, or an immediate stage of a solution to the networking problem. An algorithm generating module 234 may generate a recursive mutation algorithm from the current "bad" network signature and the network signatures previously stored in the signature repository 150 that were collected during the training mode of the diagnostic tool 208. The algorithm may be used to provide customized troubleshooting steps to a user. The user may then follow these steps to attempt to solve the networking problem.

In one embodiment, the diagnosis of the networking problem may be performed by the server 110 or the computing device that is experiencing the problem. In another embodiment, the diagnosis may be performed by both the computing device and the server 110.

Figure 3:
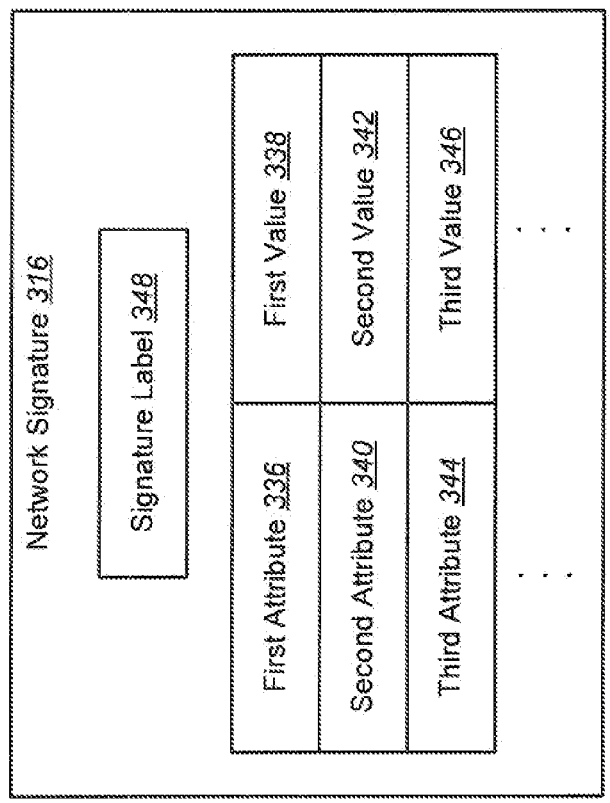
FIG. 3 is a block diagram illustrating one embodiment of a network signature.

FIG. 3 is a block diagram illustrating a further embodiment of a network signature 316. The signature 316 may include one or more attributes 336, 340, 344. Each attribute 336, 340, 344 may be associated with a value 338, 342, 346. The attributes 336, 340, 344 may be related to various settings associated with a network configuration. For example, a first attribute 336 may be whether or not a Dynamic Host Configuration Protocol (DHCP) is enabled, whether the default interface is WiFi or wired Ethernet, whether a WiFi connection is secured or unsecured, and the like. The values 338, 342, 346 of these attributes may be determined using various application programming interfaces (APIs) and commands provided by an operating system (OS) of the computing device. As a result, the network signature 316 may include a set or multiple sets of attribute-value pairs. The attributes to be considered may be defined in a schema. Based on the attribute-value pairs, a signature label 348 may be assigned to the network signature 316. For example, the signature label 348 may be "good" or "bad" depending a value 338, 342, 346 assigned to an attribute 336, 340, 344.

Figure 4:
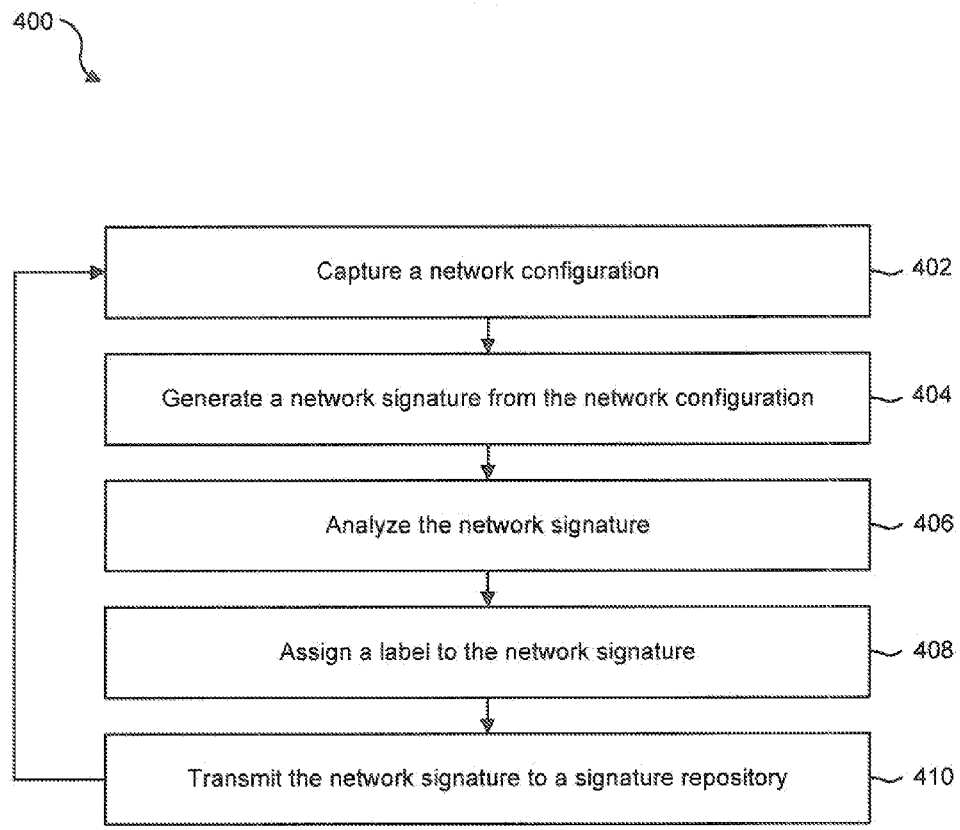
FIG. 4 is a flow diagram illustrating one embodiment of a method for collecting data to train a machine-learning algorithm.

FIG. 4 is a flow diagram illustrating one embodiment of a method 400 for collecting data that may be used to train a machine learning algorithm, such as a recursive mutation algorithm. In one embodiment, the method 400 may be implemented by the diagnostic tool 108 running as a background process on a computing device.

In one embodiment, a network configuration of a computing device may be captured 402. A network signature may be generated 404 from the captured network configuration. In one example, the network signature may be analyzed 406 and a label may be assigned 408 to the network signature based on the analysis. For example, the network signature may be labeled as a "good" network signature or a "bad" network signature. The network signature may be labeled 408 "bad" if a connection to a network is unsuccessful, and "good" if the connection is successful. The network signature may be transmitted 410 to the signature repository 150. If the signature is unable to be transmitted because the connection to the network is unsuccessful, the signature may be stored locally until a connection is established or reestablished. In one embodiment, the signature repository may be stored within a database 114. The method 400 may then return and repeat so that multiple signatures from the computing device are transmitted and stored in the signature repository 150. The signature repository 150 may receive and store multiple signatures from multiple computing devices.

Figure 5:
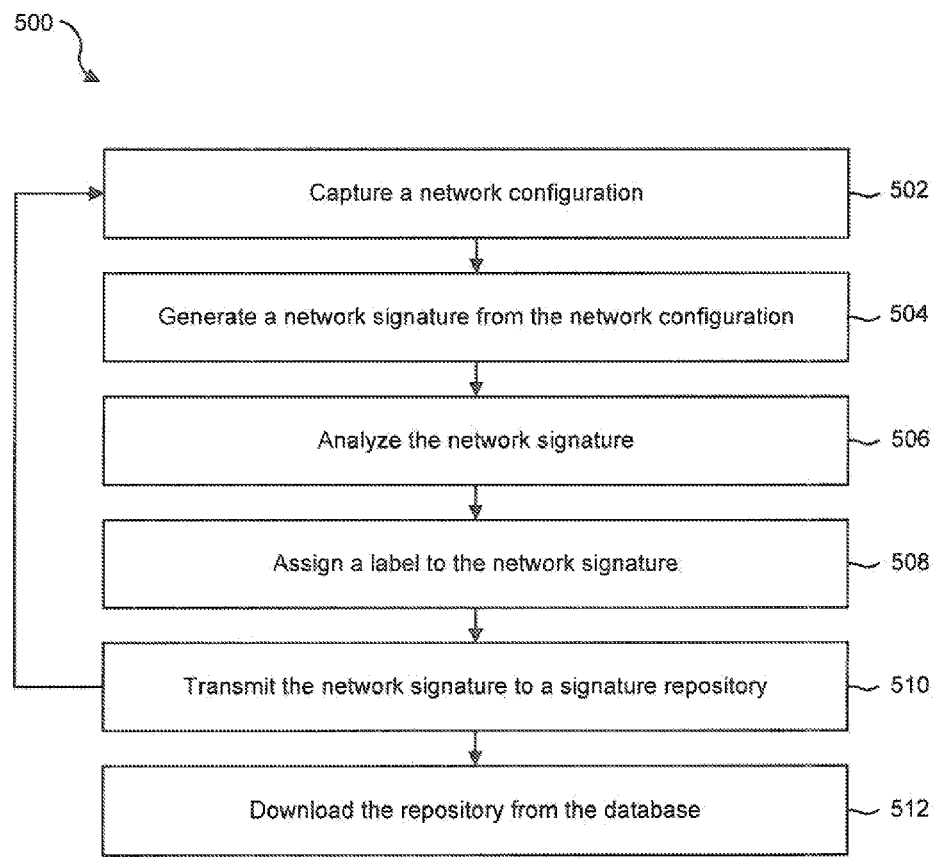
FIG. 5 is a flow diagram illustrating one embodiment of a method for downloading information from a database in order to correct a networking problem.

FIG. 5 is a flow diagram illustrating one embodiment of a method 500 for downloading information from a database 114 that may be used to correct a networking problem. In one example, the method 500 may be implemented by the diagnostic tool 108 that may be operating a diagnostic mode.

In one configuration, a network configuration may be captured 502. A network signature may be generated 504 from the network configuration. In one embodiment, the network signature may be analyzed 506 and a label may be assigned 508 to the network signature based on the analysis. The network signature may be transmitted 510 to a signature repository. The method 500 may then continue to repeat in order to capture 502 multiple network configurations, generate 504 multiple network signatures, and assign 508 a label to each network signature. The signatures may continuously be transmitted 510 to and stored within the signature repository 150. In one embodiment, the repository 150 may be periodically downloaded 512 from the database. In other words, the various network signatures stored in the repository in the database may be downloaded 512 in an attempt to correct a current or future networking problem.

Figure 6:
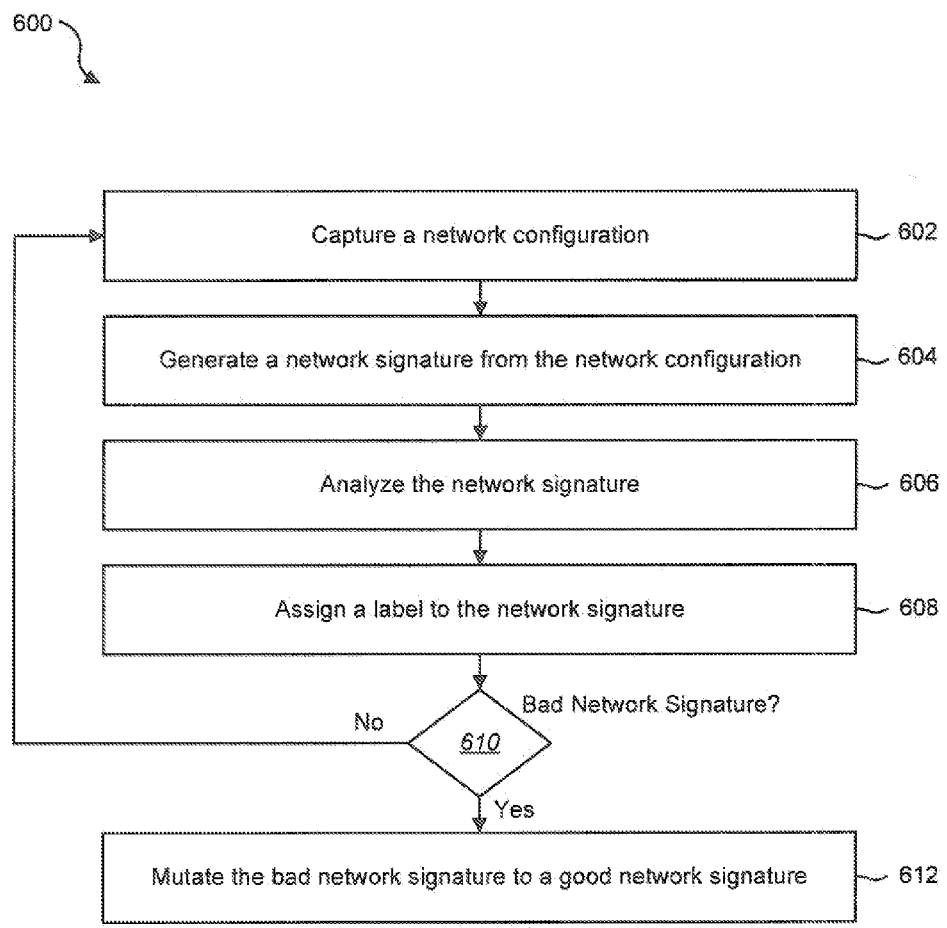
FIG. 6 is a flow diagram illustrating one embodiment of a method for changing a network signature.

FIG. 6 is a flow diagram illustrating one embodiment of a method 600 for changing a network signature using a recursive algorithm based on data stored in the signature repository 150. The method 600 may be implemented by the diagnostic tool 108 operating in the diagnostic mode.

In one embodiment, a network configuration may be captured 602. A network signature may be generated 604 from the network configuration. The network signature may be analyzed 606 and a label may be assigned 608 to the network signature. A determination 610 may be made as to whether the label assigned 608 to the network signature indicates that the network signature is a "bad" signature. If it is determined 610 that the network signature is not a "bad" network signature, the method 600 may return to capture 602 a network configuration at a later point in time. If, however, it is determined 610 that the network signature is labeled as a "bad" network signature, the signature may be mutated 612 from a "bad" signature to a "good" signature. The "bad" signature may be mutated 612 from a recursive mutation algorithm. The algorithm may be executed on data stored in the signature repository 150. The recursive algorithm, as will be explained below, may be used to change the "bad" network signature to a "good" network signature.

Figure 7:
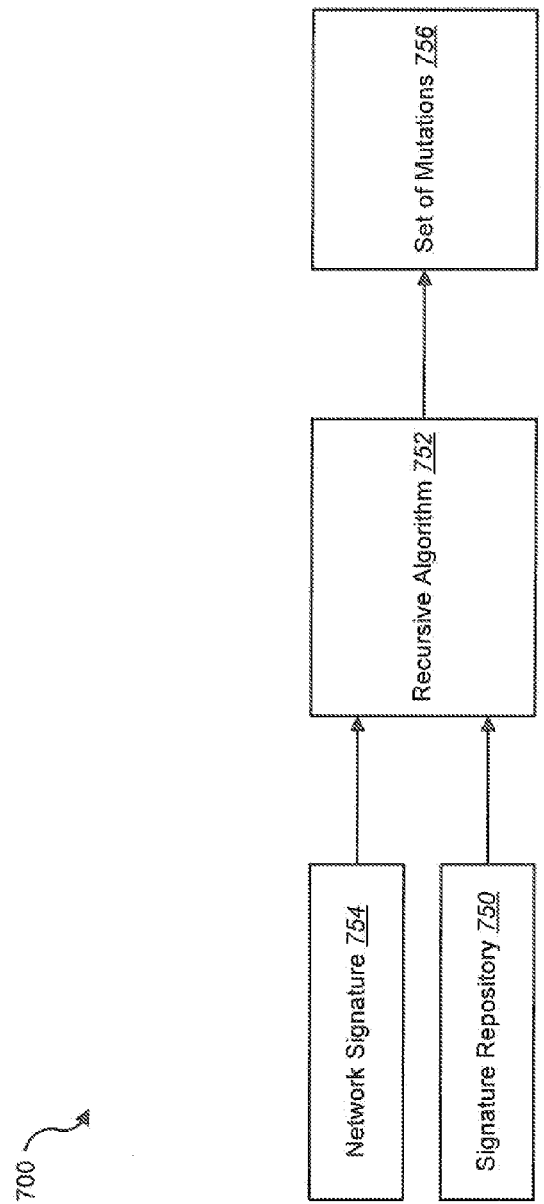
FIG. 7 is a block diagram illustrating one embodiment of inputs and outputs of a recursive algorithm.

FIG. 7 is a block diagram illustrating one embodiment of inputs and outputs of a recursive algorithm 752. In one embodiment, a "bad" network signature 754 and a signature repository 750 (that includes one or more network signatures) may be input into a recursive algorithm 752. The output of the recursive algorithm 752 may be a set of mutations 756. The set of mutations 756 may be troubleshooting steps for a user to take in order to change the "bad" network signature 754 to a "good" network signature. The recursive algorithm 752 may generate a set of mutations 756 based on the various network signatures in the signature repository 750.

Figure 8:
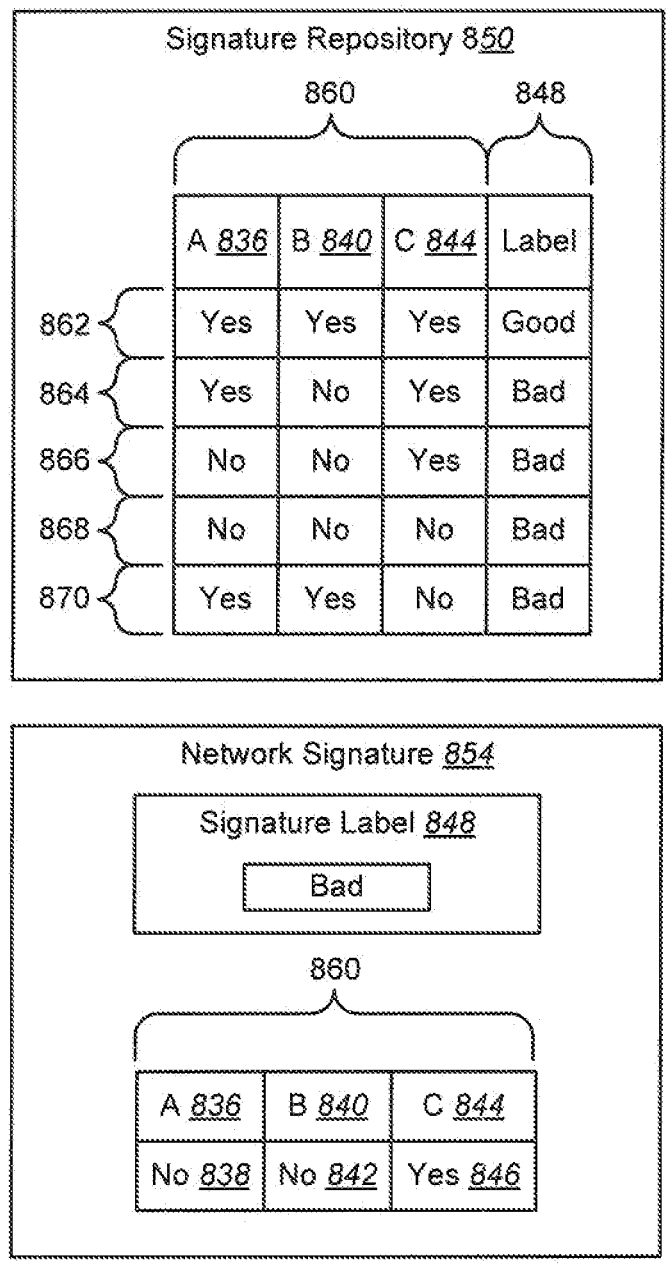
FIG. 8 is a block diagram illustrating one embodiment of a signature repository and a network signature.
Figure 9:
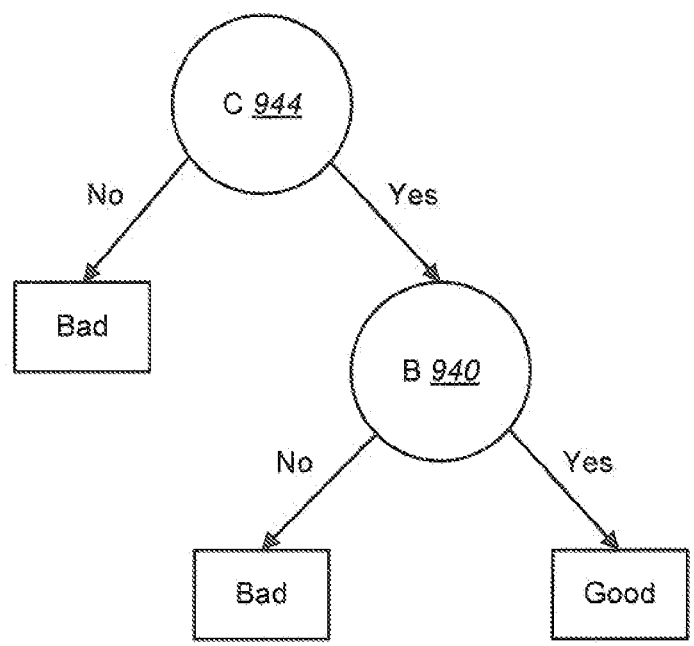
FIG. 9 illustrates one embodiment of a decision tree that may be generated from at least one network signature in the signature repository.

FIG. 8 is a block diagram illustrating a further embodiment of a signature repository 850 and a network signature 854. In one embodiment, the signature repository 850 may include various network signatures 862, 864, 866, 868, 870 indicating the network state for various computing devices. Each signature may include one or more attributes 860. Each attribute may be associated with a particular value. Based on the network configuration, a signature label 848 may be assigned to each signature. As an example, a first network signature 862 may include attribute A 836, attribute B 840, and attribute C 844. The value associated with attribute A 836 may be "yes". Similarly, the values associated with attribute B 840 and attribute C 844 may also be "yes". As a result, the label 848 for the first network signature 862 may be "good". In contrast, a second network signature 864 may be associated with a label 848 "bad". For example, the attribute A 836 and the attribute C 844 of the second network signature 864 may have the value "yes". The attribute B 840, however, may have a value "no". As a result, the label 848 for the second network signature 864 may be "bad". The various network signatures 862, 864, 866, 868, 870 in the signature repository 850 are examples only. The signatures 862, 864, 866, 868, 870 may be received from various computing devices. The signature repository 850 may be stored the database 114.

In one configuration, the network signature 854 may be assigned a signature label 848. In this example, the signature label 848 assigned to the signature 854 may be "bad". The network signature 854 may be associated with a particular computing device. The "bad" label assigned to the signature 854 may indicate that the network configurations of the computing device do not allow the device to establish or maintain network connectivity.

The network signature 854 may also include the one or more attributes 860, such as, attribute A 836, attribute B 840, and attribute C 844. A first value 838 associated with attribute A 836 may be "no". Similarly, a second value 842 associated with attribute B 840 may also be "no". A third value 846 may associated with attribute C 844 may be "yes". Based on the attribute-value pairing the network signature 854, the signature label 848 assigned to the network signature 854 may be "bad". In one configuration, when the network signature 854 of the computing device is labeled as "bad", the signature 854 and the repository 850 may be input to a recursive algorithm that may generate the set of mutations 756 for a user to follow in order to change the "bad" network signature 854 to a "good" network signature. The set of mutations 756 may be generated on the computing device that is experiencing the problem or the set of mutations 756 may be generated by the server 110. In one embodiment, the computing device and the server 110 may each generate a portion of the set of mutations 756.

FIGS. 9-12 illustrate various decision trees that are based on a recursive mutation algorithm built from at least one signature stored in a signature repository. The decision trees in FIGS. 9-12 are for illustrative purposes and are only examples.

In one embodiment, a decision tree 900 may be trained using various algorithms, such as a C4.5 algorithm on the signature repository 850. The decision tree 900 may classify any network signature into two classes (or network states), such as "good" and "bad". The network signature 854 may be classified or labeled as a "bad" network signature using the decision tree 900. For example, as previously explained, attribute C 944 of the network signature 854 is associated with the value "yes". As a result, the decision tree moves from attribute C 944 to attribute B 940. The value associated with attribute B 940 is "no". As a result, the decision tree 900 indicates that the network signature 854 is a "bad" network signature. In one embodiment, the decision tree 900 does not illustrate attribute A 836. In one example, attribute B 940 may depend from attribute A 836. For example, attribute B 940 may be assigned the value "no" if attribute A 836 is also assigned the value "no".

Figure 10:
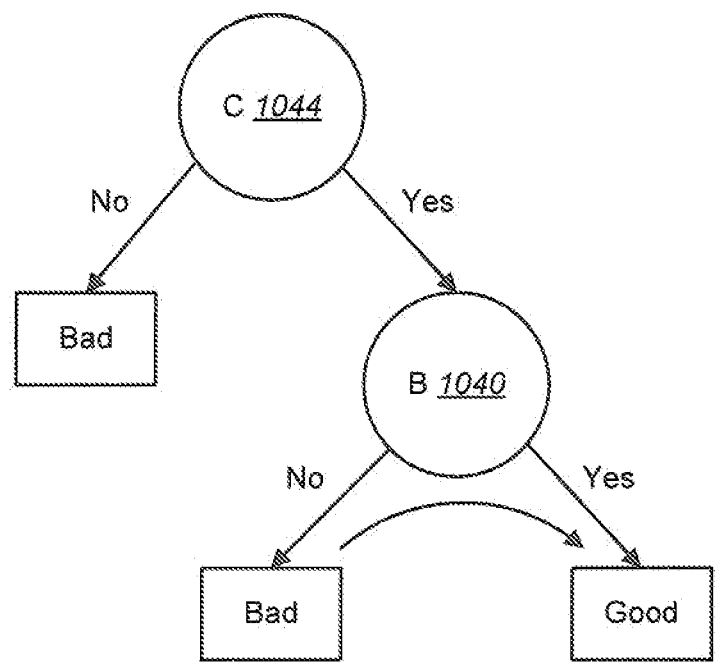
FIG. 10 illustrates a further embodiment of the decision tree that may be generated from at least one network signature in the signature repository.
Figure 11:
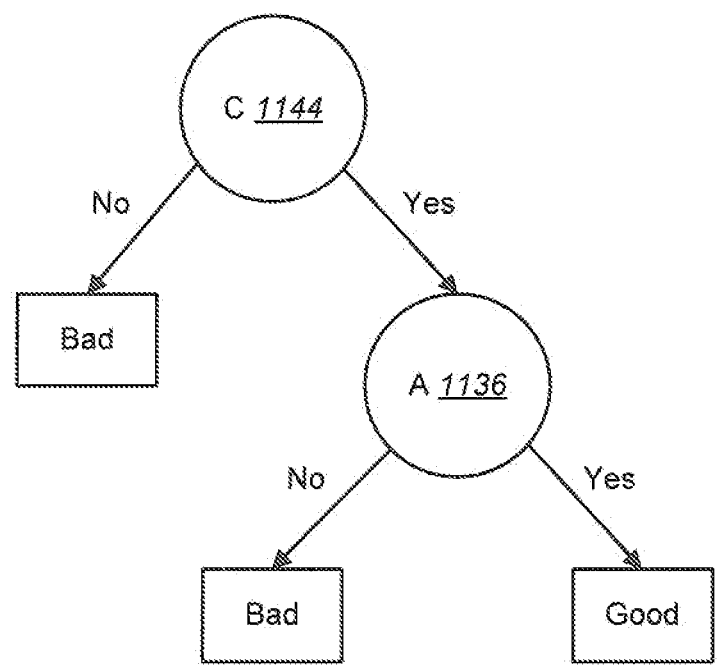
FIG. 11 illustrates a further embodiment of the decision tree that may be generated from at least one network signature in the signature repository.

FIG. 10 is a further embodiment of a decision tree 1000. The decision tree 1000 shows a mutation (change the value of attribute B 1040 from "no" to "yes") in order to change the signature 854 from a "bad" signature to a "good" signature. Changing the value of attribute B 1040, however, may result in an invalid signature because the value of attribute B 1040 will now be a "yes" while the value of attribute A 836 will still be a "no". In other words, the dependency between attribute A 836 and attribute B 1040 may be violated. This may be resolved by creating a decision tree that does not include attribute B 1040. In one embodiment, the process to identify mutations in the decision tree 1000 to change a "bad" signature to a "good" signature may include moving up the tree 1000 iteratively in order to identify "good" leaf nodes in the downstream path. The first path identified (i.e., "bad" leaf node to an ancestor, and then from that ancestor to a "good" leaf node) may denote a set of required mutations in order to change the "bad" signature to a "good" signature. The decision tree 1100 illustrated in FIG. 11 illustrates a decision tree with attribute A 1136 and attribute C 1144.

Figure 12:
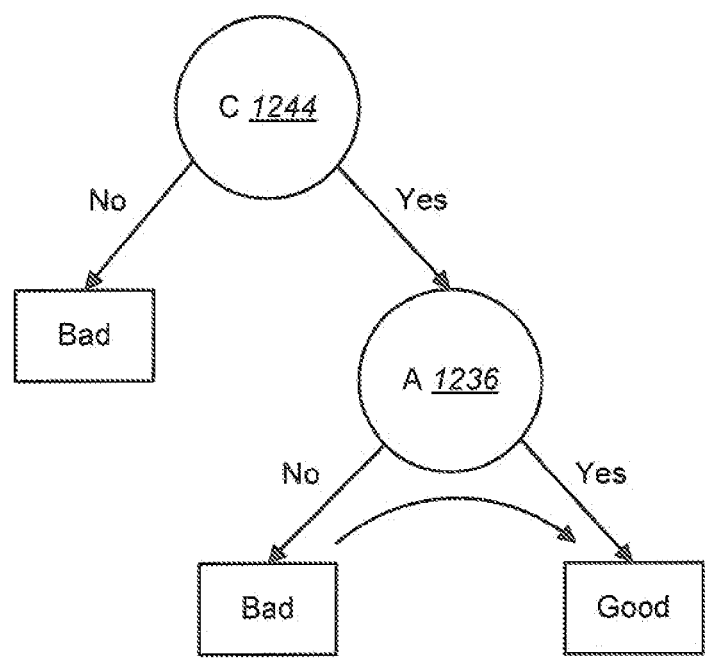
FIG. 12 illustrates a further embodiment of the decision tree that may be generated from at least one network signature in the signature repository.

FIG. 12 is a further embodiment of a decision tree 1200. The decision tree 1200 illustrates a mutation step required in order to change the network signature 854 to "good". In one example, the value of attribute A 1236 may be changed from "no" to "yes". This mutation step may cause the attribute-value pairs of the network signature 854 to now be assigned a signature label 848 of "good". The set of mutations 756 (i.e., troubleshooting steps) resulting from this particular example consists of two steps, e.g., first, changing the value of attribute A 1236, and then changing the value of attribute B 1140. In one embodiment, the set of mutations generated by the recursive mutation algorithm may be sorted in a reverse chronological order in order to create at least one troubleshooting step.

The functionality of the diagnostic tool 108 described above may be platform independent, and the network signatures from different operating systems may be indistinguishable. As a result, the tool 108 may be written for various platforms by implementing the signature generation module differently, and the tools across multiple OS platforms may have a larger repository of network signatures.

The diagnostic tool 108 may improve as more signatures are collected and the repository 150 becomes more comprehensive. Large amounts of data may help to improve the statistical significance of the machine running algorithms used to generated the set of mutations 756. In one example, the tool 108 may include a data-driven algorithm, which implies that solutions to new problems may become available as soon as relevant signatures are obtained in the repository 150.

Figure 13:
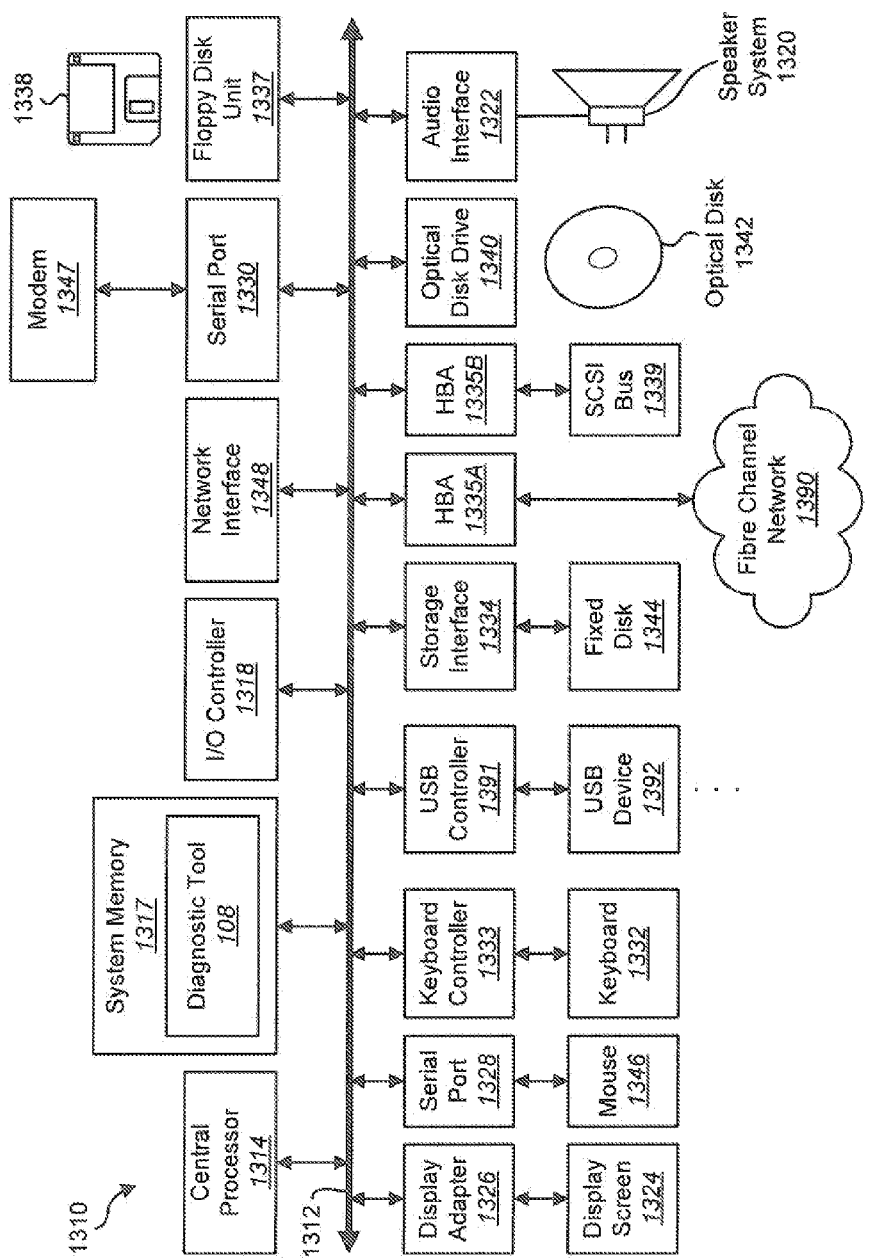
FIG. 13 depicts a block diagram of a computer system suitable for implementing the present systems and methods.

FIG. 13 depicts a block diagram of a computer system 1310 suitable for implementing the present systems and methods. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), multiple USB devices 1392 (interfaced with a USB controller 1390), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1314 and system memory 1317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the diagnostic tool 108 to implement the present systems and methods may be stored within the system memory 1317. Applications resident with computer system 1310 are generally stored on and accessed via a computer readable medium, such as a hard disk drive (e.g., fixed disk 1344), an optical drive (e.g., optical drive 1340), a floppy disk unit 1337, or other storage medium. Additionally, applications can be in the form of electronic signals modulated in accordance with the application and data communication technology when accessed via network modem 1347 or interface 1348.

Storage interface 1334, as with the other storage interfaces of computer system 1310, can connect to a standard computer readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 13 need not be present to practice the present systems and methods. The devices and subsystems can be interconnected in different ways from that shown in FIG. 13. The operation of a computer system such as that shown in FIG. 13 is readily known in the art and is not discussed in detail in this application. Code to implement the present disclosure can be stored in computer-readable medium such as one or more of system memory 1317, fixed disk 1344, optical disk 1342, or floppy disk 1338. The operating system provided on computer system 1310 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 14:
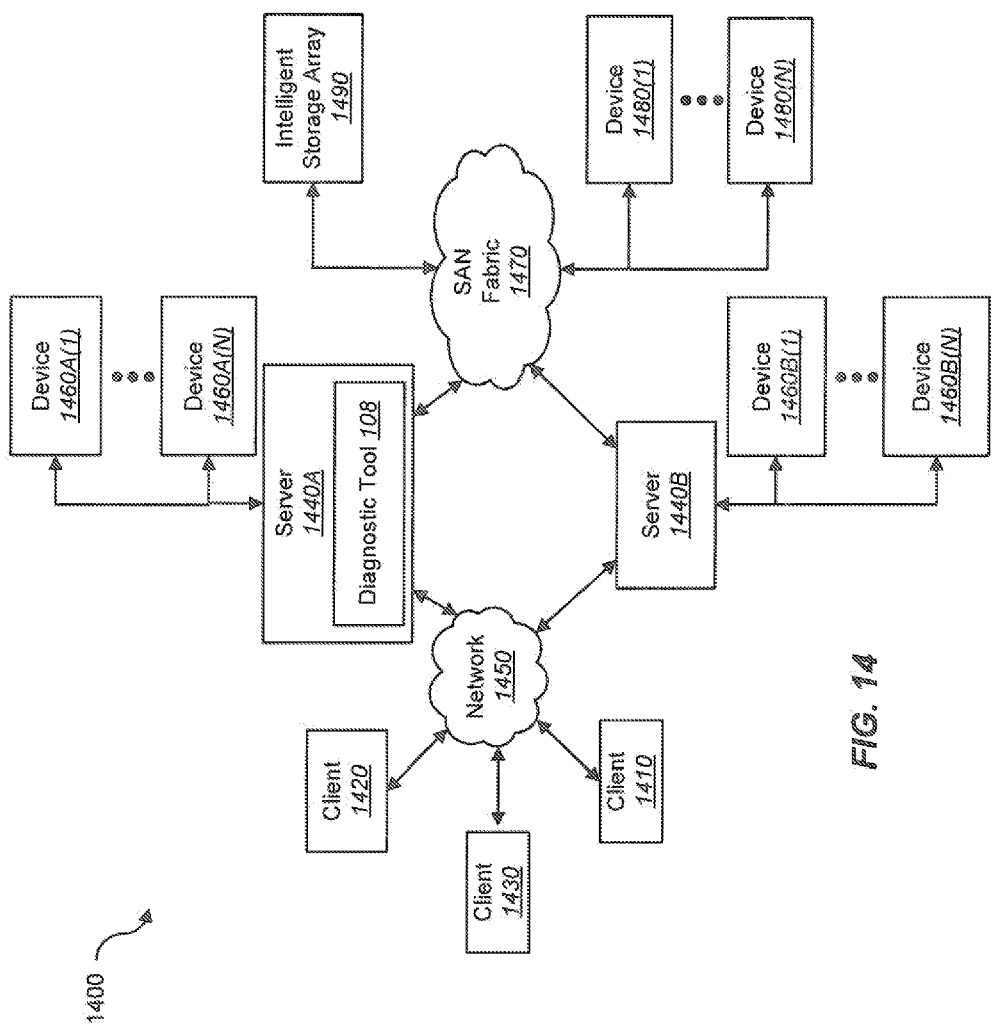
FIG. 14 is a block diagram depicting a network architecture in which client systems, as well as storage servers (any of which can be implemented using computer system), are coupled to a network.

FIG. 14 is a block diagram depicting a network architecture 1400 in which client systems 1410, 1420 and 1430, as well as storage servers 1440A and 1440B (any of which can be implemented using computer system 1310), are coupled to a network 1450. In one embodiment, the diagnostic tool 108 may be located within a server 1440A, 1440B to implement the present systems and methods. The storage server 1440A is further depicted as having storage devices 1460A(1)-(N) directly attached, and storage server 1440B is depicted with storage devices 1460B(1)-(N) directly attached. SAN fabric 1470 supports access to storage devices 1480(1)-(N) by storage servers 1440A and 1440B, and so by client systems 1410, 1420 and 1430 via network 1450. Intelligent storage array 1490 is also shown as an example of a specific storage device accessible via SAN fabric 1470.

With reference to computer system 1310, modem 1347, network interface 1348 or some other method can be used to provide connectivity from each of client computer systems 1410, 1420, and 1430 to network 1450. Client systems 1410, 1420, and 1430 are able to access information on storage server 1440A or 1440B using, for example, a web browser or other client software (not shown). Such a client allows client systems 1410, 1420, and 1430 to access data hosted by storage server 1440A or 1440B or one of storage devices 1460A(1)-(N), 1460B(1)-(N), 1480(1)-(N) or intelligent storage array 1490. FIG. 14 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for diagnosing a network configuration of a computing device, comprising:
    capturing a test network configuration;
    generating a test network signature from the test network configuration, wherein the test network signature comprises a plurality of attributes;
    assigning a label to the test network signature;
    determining whether the test network signature is labeled as an unsuccessful network signature, wherein the determination of the label is based at least in part on a value of the plurality of attributes of the test network signature;
    if the test network signature is labeled unsuccessful, generating one or more procedures to change the label; and
    modifying a value of a first of the plurality of attributes of the test network signature in relation to both a value of a second of the plurality of attributes of the test network signature and a value of an attribute of at least one other network signature.

2. The method of claim 1, further comprising downloading a repository from a database.

3. The method of claim 2, wherein the repository comprises one or more network signatures associated with one or more additional computing devices.

4. The method of claim 1, further comprising analyzing one or more values associated with one or more attributes of the test network signature.

5. The method of claim 4, further comprising assigning the label to the test network signature based on the analysis.

6. The method of claim 3, further comprising using a machine learning based algorithm based on the test network signature and the one or more network signatures in the repository.

7. The method of claim 1, further comprising providing the procedures as troubleshooting steps-to execute in order to change the label of the test network signature from unsuccessful to successful.

8. The method of claim 1, further comprising transmitting the labeled test network signature to a repository within a database.

9. The method of claim 1, further comprising generating a decision tree based on the test network signature, wherein the decision tree classifies the test network signature as unsuccessful or successful.

10. The method of claim 1, further comprising organizing the one or more procedures to execute in order to change the label into a specific order, wherein the specific order provides a minimum number of procedures to execute in order to change the label.

11. A computer system configured to diagnose a network configuration, comprising:
    a processor;
    memory in electronic communication with the processor;
    instructions stored in the memory, the instructions being executable by the processor to:
        capture a test network configuration;
        generate a test network signature from the test network configuration, wherein the test network signature comprises a plurality of attributes;
        assign a label to the test network signature;
        determine whether the test network signature is labeled as an unsuccessful network signature, wherein the determination of the label is based at least in part on a value of the plurality of attributes of the test network signature;
        if the test network signature is labeled unsuccessful, generate one or more procedures to change the label; and
        modify a value of a first of the plurality of attributes of the test network signature in relation to both a value of a second of the plurality of attributes of the test network signature and a value of an attribute of at least one other network signature.

12. The computer system of claim 11, wherein the instructions are further executable by the processor to download a repository from a database.

13. The computer system of claim 12, wherein the repository comprises one or more network signatures associated with one or more additional computing devices.

14. The computer system of claim 11, wherein the instructions are further executable by the processor to analyze one or more values associated with one or more attributes of the test network signature.

15. The computer system of claim 14, wherein the instructions are further executable by the processor to assign the label to the test network signature based on the analysis.

16. The computer system of claim 13, wherein the instructions are further executable by the processor to use a machine learning based algorithm based on the test network signature and the one or more network signatures in the repository.

17. The computer system of claim 11, wherein the instructions are further executable by the processor to provide the procedures as troubleshooting steps to execute in order to change the label of the test network signature from unsuccessful to successful.

18. The computer system of claim 11, wherein the instructions are further executable by the processor to transmit the labeled test network signature to a repository within a database.

19. The computer system of claim 11, wherein the instructions are further executable by the processor to generate a decision tree based on the test network signature, wherein the decision tree classifies the test network signature as unsuccessful or successful.

20. A computer-program product for diagnosing a network configuration of a computing device, the computer-program product comprising a non-transitory computer-readable storage medium storing instructions thereon, the instructions being executable by a processor to:

capture a test network configuration;

generate a test network signature from the test network configuration, wherein the test network signature comprises a plurality of attributes;

assign a label to the test network signature;

determine whether the test network signature is labeled as an unsuccessful network signature, wherein the determination of the label is based at least in part on a value of the plurality of attributes of the test network signature;

if the test network signature is labeled unsuccessful, generate one or more procedures to change the label; and modify a value of a first of the plurality of attributes of the test network signature in relation to both a value of a second of the plurality of attributes of the test network signature and a value of an attribute of at least one other network signature.

\* \* \* \* \*